US009371590B2

(12) United States Patent
Morel

(10) Patent No.: US 9,371,590 B2
(45) Date of Patent: Jun. 21, 2016

(54) METHOD FOR OPERATING A HIGH-TEMPERATURE ELECTROLYZER COMPRISING A STEP OF REDUCING THE MATERIAL OF THE CATHODES

(71) Applicant: COMMISSARIAT A L'ENERGIE ATOMIQUE ET AUX ENE ALT, Paris (FR)

(72) Inventor: Bertrand Morel, Saint Martin le Vinoux (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 212 days.

(21) Appl. No.: 14/362,247

(22) PCT Filed: Dec. 4, 2012

(86) PCT No.: PCT/EP2012/074384
§ 371 (c)(1),
(2) Date: Jun. 2, 2014

(87) PCT Pub. No.: WO2013/083573
PCT Pub. Date: Jun. 13, 2013

(65) Prior Publication Data
US 2014/0291165 A1 Oct. 2, 2014

(30) Foreign Application Priority Data
Dec. 5, 2011 (FR) .................................... 11 61151

(51) Int. Cl.
*C25B 1/04* (2006.01)
*C25B 15/02* (2006.01)
*C25B 1/06* (2006.01)
*C25B 9/18* (2006.01)

(52) U.S. Cl.
CPC . *C25B 15/02* (2013.01); *C25B 1/04* (2013.01); *C25B 1/06* (2013.01); *C25B 9/18* (2013.01); *Y02E 60/366* (2013.01)

(58) Field of Classification Search
CPC .................................. C25B 1/04; C25B 15/02
See application file for complete search history.

(56) References Cited

U.S. PATENT DOCUMENTS 7,514,166 B2    4/2009  Hickey et al.
2005/0053812 A1* 3/2005  Hickey ............... H01M 4/8621
                                                429/411

(Continued)

FOREIGN PATENT DOCUMENTS

WO   WO 2009/040334 A2   4/2009
WO   WO 2009/040335 A2   4/2009
WO   WO 2011/110675 A1   9/2011

OTHER PUBLICATIONS

International Search Report issued Jun. 19, 2013, in PCT/EP12/074384 filed Dec. 4, 2012.

(Continued)

*Primary Examiner* — Nicholas A Smith
(74) *Attorney, Agent, or Firm* — Oblon, McClelland, Maier & Neustadt, L.L.P

(57) ABSTRACT

A method for operating an installation for producing hydrogen including at least one high temperature electrolyzer for producing hydrogen, the electrolyzer including a plurality of elementary cells, each including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet containing nickel, the method including: a) raising a temperature of the cells up to an operating temperature of the electrolyzer comprised between 650° C. and 950° C.; b) applying a potential difference on terminals of the elementary cells at least equal to 0.62 V.

18 Claims, 3 Drawing Sheets

(56) References Cited

U.S. PATENT DOCUMENTS

Figure 1:
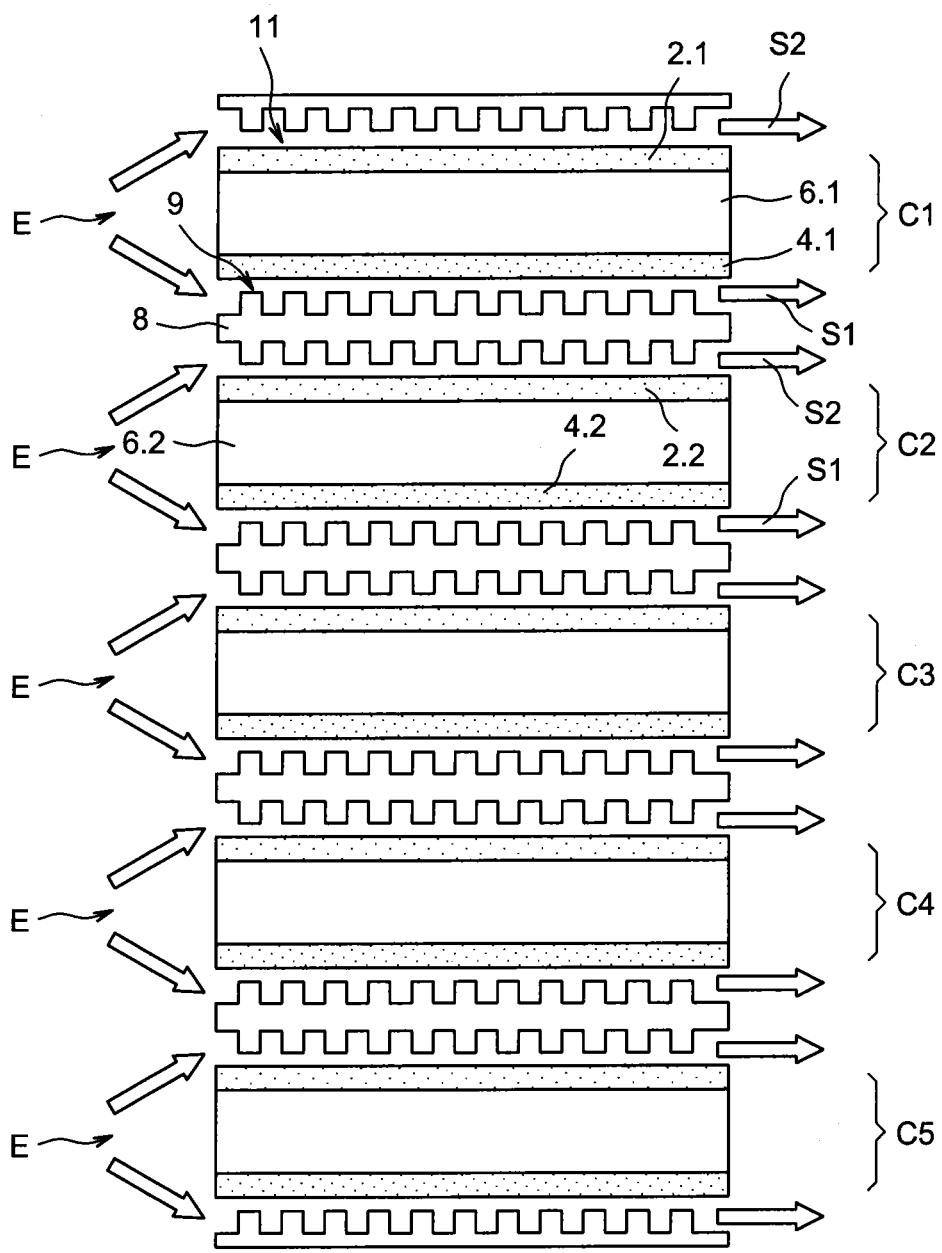

| | | |
|---|---|---|
| 2006/0166070 A1 | 7/2006 | Hickey et al. |
| 2006/0222929 A1 | 10/2006 | Hickey et al. |
| 2008/0261098 A1 | 10/2008 | Lemmon et al. |
| 2009/0291346 A1 | 11/2009 | Hickey et al. |
| 2012/0325677 A1 | 12/2012 | Le Gallo |
| 2013/0061661 A1 | 3/2013 | Morel et al. |

OTHER PUBLICATIONS

Hauch, et al., "Highly efficient high temperature electrolysis", Journal of Materials Chemistry, vol. 18, XP008126076, 2008, pp. 2331-2340.

French Preliminary Search Report issued Aug. 14, 2012 in French Patent Application No. FR 1161151 (with English translation of categories of cited documents).

Toru Hatae, et al., "Current density dependence of changes in the microstructure of SOFC anodes during electrochemical oxidation" Solid State Ionics 180, 2009, pp. 1305-1310.

D. Larrain, et al., "Simulation of SOFC stack and repeat elements including interconnect degradation and anode reoxidation risk" Journal of Power Sources 161, 2006, pp. 392-403.

Christian Mallon, et al., "Sensitivity of nickel cermet anodes to reduction conditions" Journal of Power Sources 145, 2005, pp. 154-160.

Y. Wang, et al., "Effects of powder sizes and reduction parameters on the strength of Ni-YSZ anodes" Solid State Ionics 177, 2006, pp. 1517-1527.

\* cited by examiner

METHOD FOR OPERATING A HIGH-TEMPERATURE ELECTROLYZER COMPRISING A STEP OF REDUCING THE MATERIAL OF THE CATHODES

TECHNICAL FIELD AND PRIOR ART

The present invention relates to a method for operating a high temperature electrolyzer including a step of reducing the material of the cathodes.

A high temperature steam electrolyzer includes a plurality of elementary cells formed by a cathode and an anode separated by an electrolyte, the elementary cells being electrically connected in series by means of interposed interconnecting plates, generally between an anode of an elementary cell and a cathode of the next elementary cell. An anode-anode connection followed by a cathode-cathode connection is also possible. The interconnecting plates are electron conducting components formed by a metal plate. These plates moreover ensure separation between the cathodic fluid circulating at the level of an elementary cell and the anodic fluid circulating in a next elementary cell.

A high temperature steam electrolyzer operates in the following way: steam circulates on the cathode side and by applying a potential difference on the terminals of the elementary cells, this steam is disassociated while generating hydrogen at the cathode and oxygen at the anode.

The anode and the cathode are in a porous material in which gases may flow and are in majority electron conducting.

The electrolyte separating both of these electrodes, as for it, is dense, it is impervious to gas and is an ion conductor. Its thickness depends on the type of cell. The electrolyte may also ensure the function of mechanically supporting the cell and its thickness is of the order of about 100 microns, in this case, the electrolyzer is designated as one with a supporting electrolyte. Alternatively, it is the cathode which ensures this function, and the electrolyte film typically has a thickness of the order of about 10 µm. The electrolyte is for example made in yttrium-stabilized zirconia or yttriated zirconia.

As indicated above, the cathode is a gas-porous electrode. Its solid skeleton is formed with a ceramic-metal composite called a cermet. The composite material should have high electron conductivity, for example greater than 100 S/cm and if possible ion conductivity, a large number of triple points (locations of the reaction) and catalytic activity for the steam reduction reaction. Further, its stability under a reducing atmosphere and in the presence of water should be ensured, as well as its compatibility with the materials of the interconnecting plate and of the electrolyte. It also has a thermal expansion coefficient compatible with that of the electrolyte. The Ni—YSZ cermet has these properties. It is obtained by sintering a mixture of particles of nickel oxide and zirconia stabilized with yttrium oxide.

The anode is also a porous electrode. It should have electron and ion conductivity similar to that of the cathode. A conventional material making it is a perovskite, for example LSM ($La_{1-x}Sr_xMnO_3$), which has been for a long time the reference material because of its relatively good chemical compatibility with YSZ. Because of its low ion conductivity and of an expansion coefficient slightly greater than that of 8YSZ, it is generally mixed with YSZ for making a composite electrode. The perovskite $La_{1-x}Sr_xCo_{1-y}Fe_yO_{3-\delta}$, noted as LSCF may also be mentioned and which is the reference oxygen electrode material for cells with a supporting electrode.

The high temperature operation of these devices, generally between 700° C. and 900° C., is imposed by the conduction property of yttriated zirconia as an electrolyte. Indeed, the electrolyte YSZ is a good ion conductor but only at high temperature. A reduction phase prior to electrolysis is however necessary for transforming the nickel oxide NiO of the cermet of the cathode into nickel Ni.

This reduction step carried out before the beginning of the electrolysis is achieved by circulating a reducing gas flow, typically hydrogen in the cathode for transforming NiO into Ni. This technique is satisfactory when the supply of the anode compartment and the supply of the cathode compartment are separate. These separate supplies allow the reducing gas to be circulated only at the cathode.

But, in the case of a high temperature electrolyzer including a single supply inlet connected to the anode compartment and to the cathode compartment, such a technique cannot be contemplated. Indeed, injection of a reducing gas at the cathode would also cause circulation of reducing gas at the anode, now this reducing gas might deteriorate the conduction properties, as well as electrochemical properties of the anode.

DISCUSSION OF THE INVENTION

Therefore an object of the present invention is to provide a method for operating a high temperature water electrolyzer in which the anode is protected during the reduction step.

The aforementioned object is achieved by a method for operating a high temperature electrolyzer for producing hydrogen, including a step for establishing a temperature comprised between 650° C. and 950° C., a step for circulating an inert gas or steam and a step for applying a potential difference between the cathode and the anode of at least 0.62 V, having the effect of reducing nickel oxide. The potential difference applied to each of the elementary cells depends on the temperature. It will be of the order of 0.62 V for a temperature of 950° C. and of 0.7 V for a temperature of 800° C.

This potential difference generates an oxygen flow from the cathode to the anode. This is expressed by the pumping of the oxygen present in the cermet, migration of oxygen in anionic form ($O^{2-}$) through the electrolyte, reduction of NiO into Ni and oxygen gas generation at the anode.

This method has the advantage of maintaining a high oxygen partial pressure greater than or equal to $10^{-5}$ atm, which preserves its integrity.

In an embodiment, the electrolyzer is supplied with a neutral gas which allows the cermet to be re-oxidized.

In another embodiment, the electrolyzer is supplied with steam as soon as the reduction phase for the nickel oxide. The first sites where NiO is reduced into Ni cause reduction of water into hydrogen, this hydrogen then participates in the reduction of the remaining NiO like in the method of the state of the art, while not damaging the anode.

The subject-matter of the present invention is then a method for operating a facility for producing hydrogen comprising at least one high temperature electrolyzer, said electrolyzer including a plurality of elementary cells, each of the elementary cells including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet containing nickel, said method including the steps:

a) raising the temperature of the cells up to an operating temperature of the electrolyzer comprised between 650° C. and 950° C., b) applying a potential difference to the terminals of each of the elementary cells equal to at least 0.62 V.

Very advantageously, during step a) the temperature is raised up to a temperature comprised between 700° C. and 900° C., and, during step b), the potential difference on the terminals of each of the elementary cells is equal to at least 0.65 V.

In a first embodiment, during step b), at least the cathode compartments are supplied with a neutral gas, for example nitrogen.

In a second embodiment, during step b), at least the cathode compartments are supplied with steam.

The operating method may include after step b), the steps,
c) for supplying steam to the cathode compartments,
d) for applying a potential difference on the terminals of the elementary cells capable of causing electrolysis of water on,
e) for collecting the hydrogen produced at the cathodes and the oxygen produced at the anodes.

Steps c) and d) preferably begin simultaneously.

According to the second embodiment, during step c) the steam flow rate is increased relatively to that of step b).

Advantageously, during step b), a current on the terminals of the elementary cells is measured. Step c) may then begin when the current measured on the terminals of the elementary cells is less than a predetermined threshold value.

The subject-matter of the present invention is also an installation for producing hydrogen including at least one high temperature electrolyzer, said electrolyzer including:
a plurality of elementary cells, each of the elementary cells including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet containing nickel,
a supply of steam for at least the anode compartments,
means for collecting the hydrogen produced at the cathodes and the oxygen produced at the anodes,
a voltage source,
a control unit controlling the installation so that during a first operating phase, the temperature of the cells attains an operating temperature comprised between 650° C. and 950° C. and a potential difference at least equal to 0.62 V is applied on the terminals of the elementary cells.

The electrolyzer may advantageously include a single supply for the anode compartments and for the cathode compartments.

In an embodiment, the installation may include a neutral gas source, the control unit controlling the supply of neutral gas to the cathode compartments at least during the first operating phase.

In another embodiment, the control unit controls the supply of steam to the cathode compartments at least during the first operating phase.

Advantageously, the installation includes means for measuring the current on the terminals of the elementary cells, the control unit controlling the supply of water to the cathode compartments according to the measured current value and controls the voltage on the terminals of the elementary cells so that a second operating phase of electrolysis of water begins when the value of the measured current is less than a given threshold value corresponding to an amount of nickel oxide at the cathodes of less than a predetermined amount.

The cathodes are for example in Ni-yttriated zirconia cermet.

SHORT DESCRIPTION OF THE DRAWINGS

Figure 2:
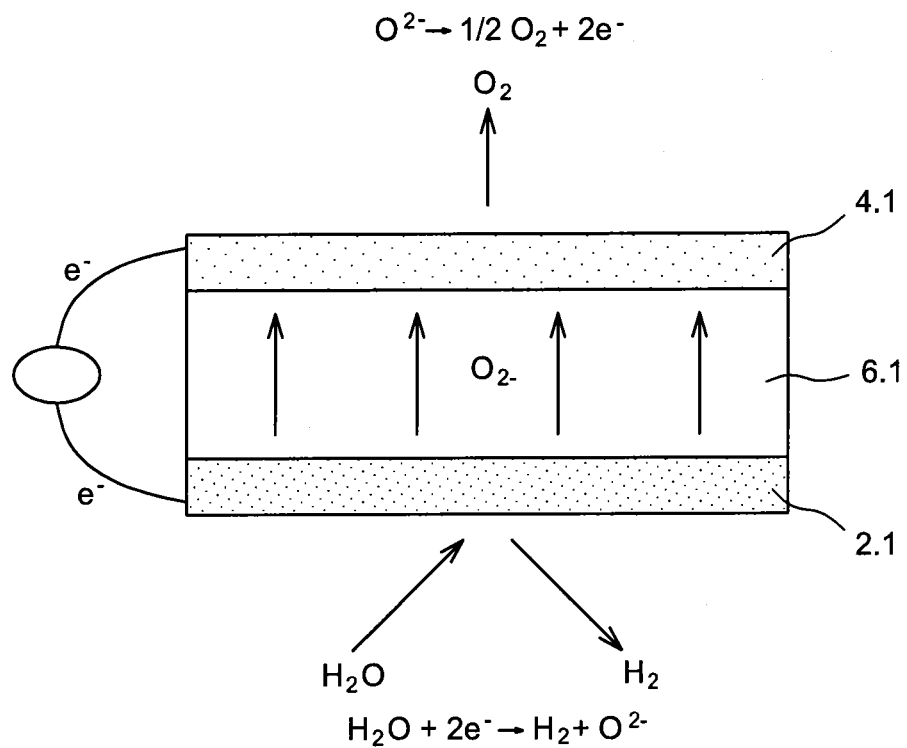
Figure 3:
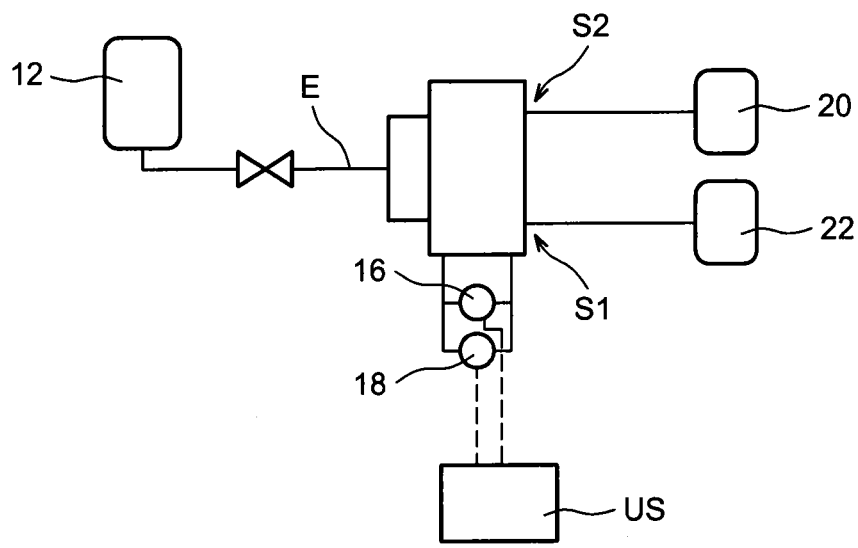
Figure 4:
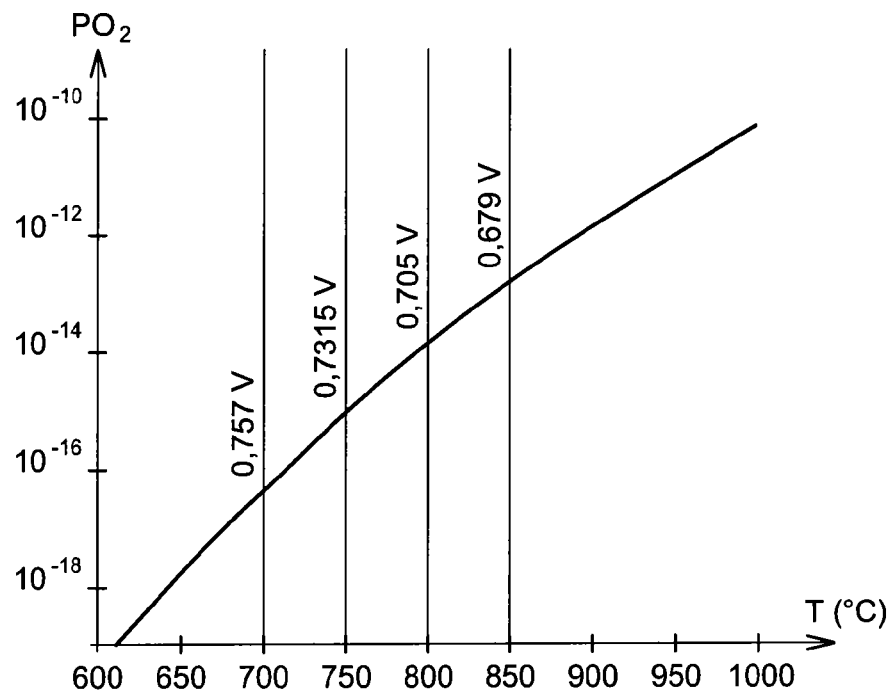
Figure 5:
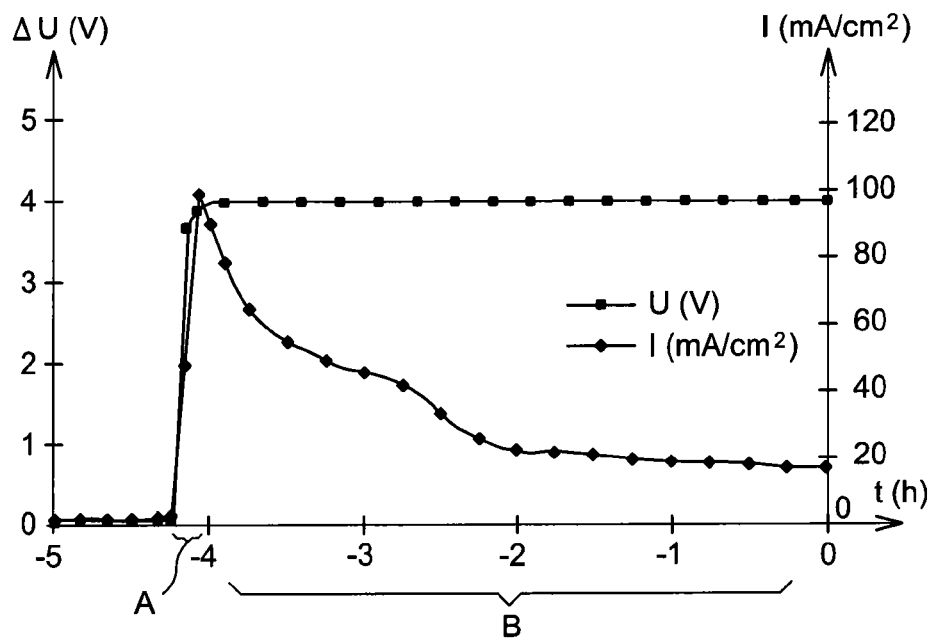

The present invention will be better understood by means of the description which follows and of the appended drawings wherein:

FIG. 1 is a schematic sectional view of a high temperature electrolyzer to which may be applied the operating method according to the invention, FIG. 2 is a schematic illustration of an elementary cell of the electrolyzer of FIG. 1 illustrating the reactions at the anode and at the cathode during electrolysis of water, FIG. 3 is a schematic illustration of an installation for producing hydrogen comprising the electrolyzer of FIG. 1, FIG. 4 is a graphic illustration of the variation of the oxygen partial pressure in an atmosphere in Ni/NiO equilibrium versus the temperature in ° C., FIG. 5 is a graphic illustration of the variation of the current in $mA/cm^2$ at terminals of the electrolyzer versus time in hours during the step for reducing NiO into Ni.

DETAILED DISCUSSION OF PARTICULAR EMBODIMENTS

In FIG. 1, an exemplary embodiment of a high temperature electrolyzer HTE, illustrated schematically, may be seen, to which the operating method according to the present invention may be applied. The electrolyzer includes a plurality of stacked elementary cells C1, C2 . . . .

Each elementary cell includes an electrolyte positioned between a cathode and an anode.

In the continuation of the description, we shall describe in detail the cells C1 and C2 and their interface.

The cell C1 includes a cathode 2.1 and an anode 4.1 between which an electrolyte 6.1 is positioned.

The cell C2 includes a cathode 2.2 and an anode 4.2 between which is positioned an electrolyte 6.2.

The cathodes 2.1, 2.2 and the anodes 4.1, 4.2 are made in porous material. The cathodes are formed by a cermet including nickel, for example this may be a nickel-yttriated zirconia (NiYSZ) cermet, a nickel-ceria cermet doped with gadolinium designated as Ni-CGO. The anodes for example are in $La_{1-x}Sr_xCo_{1-y}Fe_yO_{3-\delta}$, noted as LSCF or in LSM.

The anode 4.1 of the cell C1 is electrically connected to the cathode 2.2 of the cell C2 through an interconnecting plate 8 coming into contact with the anode 4.1 and the cathode 2.2. Moreover, it gives the possibility of electrically powering the anode 4.1 and the anode 2.2 and is for example in YSZ.

An interconnecting plate 8 is interposed between two elementary cells. In the illustrated example, it is interposed between an anode of an elementary cell and the cathode of the adjacent cell. But provision may be made for having it interposed between two anodes or two cathodes.

The interconnecting plate 8 defines with the anode and the cathode adjacent to the channels for circulation of fluids. They define anode compartments 9 dedicated to circulation of gases at the anodes and cathode compartments 11 dedicated to circulation of gases at the cathodes.

This electrolyzer includes single supply inlets E (schematically illustrated) both for anode compartments 9 and for cathode compartments 11 and two discharge outlets 51, 52 (schematically illustrated), one Si for hydrogen produced in the cathode compartments 11 and the other 52 for oxygen produced in the anode compartments. The electrolyzer is supplied with steam.

The operating temperature of such an electrolyzer is comprised between 650° C. and 950° C.

In FIG. 2, are illustrated the reactions occurring at the anode and at the cathode during an electrolysis of water.

At the cathode, the following reduction reaction occurs:

$$H_2O + 2e^- \rightarrow H_2 + O^{2-} \quad (I)$$

There is then production of hydrogen.

The anions $O^{2-}$ produced at the cathode cross the electrolyte towards the anode and the following oxidation reaction occurs:

$$O^{2-} \rightarrow \tfrac{1}{2}O_2 + 2e^- \quad (II)$$

There is then production of oxygen.

In FIG. 3, an installation for producing hydrogen may be seen, including the electrolyzer HTE of FIG. 1.

The installation also includes a source of steam 12, optionally a neutral gas source (not shown), a voltage source 16 capable of applying a voltage to the terminals of the elementary cells, and a control unit UC controlling the operation of the installation, and means 20, 22 for collecting hydrogen and oxygen respectively. Advantageously, the installation includes means for measuring the current on the terminals of the elementary cells 18.

Before normal use of the electrolyzer for producing hydrogen, the following steps of the operating method take place:

a) setting the electrolyzer to its operating temperature, for example between 650° C. and about 950° C., advantageously between 600° C. and 900° C., b) applying a potential difference ΔU of at least 0.62 V between the anode and the cathode of each elementary cell, advantageously at least 0.65 V.

During step b), the potential difference ΔU has the effect of imposing an oxygen flow from the cathode to the anode, which is expressed by pumping of the oxygen present in the cermet, more particularly the one present in the NiO, a migration of oxygen in the anionic form ($O^{2-}$) through the electrolyte (symbolized by arrows), and generation of oxygen gas at the anode.

The nickel oxide NiO of the cathode is then reduced into Ni, this without applying a reducing gas which would be detrimental to the anode. Further because of the generation of oxygen gas at the anode, oxygen partial pressure is maintained high at the anode which allows it to preserve its integrity.

It is the $O_2$ partial pressure in the cathode compartment which determines the Ni/NiO equilibrium, and this equilibrium depends on the temperature. In the table below, the potential difference ΔU values to be applied to the terminals of each elementary cell are grouped which depend on the operating temperature of the electrolyzer and on the $O_2$ partial pressure.

| Variation of the oxygen partial pressure versus temperature and the potential difference ΔU to be applied | | |
|---|---|---|
| T° C. | PO$_2$ (atm) | ΔU (V) |
| 650 | 1.60929E−18 | 0.78 |
| 700 | 4.22526E−17 | 0.75 |
| 750 | 8.06013E−16 | 0.73 |
| 800 | 1.16814E−14 | 0.70 |
| 850 | 1.33428E−13 | 0.67 |
| 900 | 1.2383E−12 | 0.65 |
| 950 | 9.57832E−12 | 0.62 |

In FIG. 4, the time-dependent change in the oxygen partial pressure may be seen at Ni/NiO equilibrium, plotted from the data of the above table.

In the case of an electrolyte in YSZ, the potential difference is less than 1.8 V in order to avoid degradation of the electrolyte.

In a first embodiment, during step b), the elementary cells are supplied with neutral gas, for example nitrogen. The presence of this neutral gas has the effect of avoiding re-oxidation of the nickel. The neutral gas flow also allows the oxygen produced of the anode to be drained.

In a second embodiment, during step b), the anode and cathode compartments are directly supplied with steam.

We shall describe the time-course of the operating method according to this second embodiment.

During a first phase and similarly to the embodiment described previously, the nickel oxide is reduced into nickel by pumping oxygen through the electrolyte.

During a second phase, the nickel oxide continues to be reduced into nickel, simultaneously the first NiO sites reduced into Ni are the location of reduction of water according to reaction (I), and produce hydrogen. Now this hydrogen is a reducing gas, it therefore participates in the reduction of the remaining NiO.

In this embodiment, NiO is reduced both by pumping the oxygen through the electrolyte and by the hydrogen generated in situ. Also in this embodiment, the oxygen produced at the anode maintains a high oxygen partial pressure at the anode.

This embodiment has the advantage of not requiring any neutral gas supply and no switching in the supply circuits, the water supply circuit of the electrolyzer is directly used.

Further step b) is faster in the first embodiment since, simultaneously with the pumping of oxygen, the NiO is reduced by the produced hydrogen. Or alternatively, this embodiment gives the possibility of carrying out this step b) as fast as with the first embodiment but with a smaller potential difference.

In both embodiments, the amount of NiO reduced into Ni may be followed by measuring the current on the terminals of the elementary cells. In FIG. 5, the time-dependent change of the current in mA/cm$^2$ on the terminals of the electrolyzer of three elementary cells versus time for a voltage applied to each cell of 1.33 V and at a temperature of 800° C. The amount of current represents the oxygen flow through the electrolyte therefore the amount of NiO sites reduced to Ni during a first phase A, which is almost instantaneous, the amount of current increases, a large amount of NiO sites are reduced into Ni. Beyond an extreme, a phase B begins during which the current on the terminals of the elementary cells decreases. When the current is quasi-zero, nearly all the NiO is reduced into Ni. By integrating the curve of the current versus time, it is possible to determine the amount of oxygen extracted from the cermets, therefore the amount of NiO reduced into Ni. From comparison with the initial NiO mass, the percentage of NiO which has been reduced into Ni may be inferred. From the graph of FIG. 5, it may be estimated that after 2 hrs, at least 50% of the initial NiO mass has been reduced into Ni.

Provision may be made for controlling step b) with the current, i.e. the oxygen flow may be imposed through the electrolyte.

The greater the potential difference applied to the terminals of the electrolyzer, the faster will be the reduction of NiO into Ni.

This potential difference is for example comprised between 0.7 V and 1.3 V. It is therefore possible to adjust the reduction rate by controlling the imposed potential difference on the terminals of the electrolyzer. Nevertheless, the difference of potentials applied during step b) is preferably selected to be low, preferably comprised between 0.7 V and 0.9 V in order to achieve homogeneous reduction i.e. the reduction of NiO into Ni over the whole of the surface of the electrode, even if it is slower.

At 800° C., the voltage for reducing NiO to Ni may be ensured from 705 mV and electrolysis of water may occur under a voltage of 839 mV for an inflowing $H_2O/H_2=90/10$ mixture.

The second embodiment allows simplified automation of the operation of the electrolyzer. Indeed, a control unit determines from the measurement of the current on the terminals of the electrolyzer, when the current is less than a predetermined maximum value, that electrolysis of the water may begin. It then controls an increase in the flow rate of the steam and a rise of the potential difference. No valve is required for changing the supply of the electrolyzer.

When it is considered that the cathodes are able to operate, i.e. they include sufficient Ni:

in the first embodiment, the neutral gas supply is interrupted, the electrolyzer is supplied with steam and the potential difference is increased to a value typically comprised between 1 V and 1.3 V which corresponds to the potential difference value for carrying out the electrolysis of the water, in the second embodiment, the steam flow rate is increased and the potential difference is increased to a value typically comprised between 1 V and 1.3 V.

The minimum voltage for electrolysis of water depends on the inflowing mixture and on the operating temperature. As example, for an inflowing $H_2O/H_2=90/10$ mixture, the minimum voltages U to be imposed depending on the temperature T are:

| T (° C.) | U (V) |
|---|---|
| 650 | 0.902 |
| 700 | 0.881 |
| 800 | 0.839 |
| 850 | 0.819 |
| 900 | 0.798 |
| 950 | 0.777 |

The minimum voltage to be imposed for electrolysis of water is greater than the minimum voltage to be imposed for reduction of NiO into Ni.

Preferably, the steps a) and b) advantageously occur before each shot starting of the high temperature electrolyzer.

The operation method according to the invention is particularly advantageous for a high temperature electrolyzer having a single supply inlet for the anode and cathode compartments. However such a method may also be applied to a high temperature electrolyzer having separate supplies for the anode and cathode compartments. For example, the method would then include the steps for supplying steam to the cathode compartments and neutral gas to the anode compartments and for applying a potential difference on the terminals of the elementary cells of at least 0.62V for an operating temperature comprised between 650° C. and 950° C. Once the operating temperature is attained, the electrolyzer may then be directly supplied with steam without requiring a reduction step under $H_2$.

The invention claimed is:

1. A method for operating an installation for producing hydrogen including at least one high temperature electrolyzer, the electrolyzer including a plurality of elementary cells, each of the elementary cells including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet including nickel, the method comprising:
   a) raising a temperature of the cells to an operating temperature of the electrolyzer comprised between 650° C. and 950° C.;
   b) applying a potential difference to terminals of each of the elementary cells equal to at least 0.62 V;
   c) supplying the cathode compartments and the anode compartments with neutral gas, or with nitrogen or steam;
   d) supplying the cathode compartments and the anode compartments with steam;
   e) applying a potential difference to the terminals of the elementary cells capable of causing electrolysis of water;
   f) collecting hydrogen produced at the cathodes and the oxygen produced at the anodes.

2. The operating method according to claim 1, wherein during a) the temperature is raised up to a temperature comprised between 700° C. and 900° C., and, during b), the potential difference on the terminals of each of the elementary cells is equal to at least 0.65 V.

3. The operating method according to claim 1, wherein the potential difference applied during e) is greater than that applied during b).

4. The operating method according to claim 1, wherein the potential difference applied during b) is less than 0.9V.

5. The operating method according to claim 1, wherein d) and e) begin simultaneously.

6. The operating method according to claim 1, wherein, during d), a steam flow rate is increased relatively to that of b).

7. The operating method according to claim 1, wherein during b), a current on the terminals of the elementary cells is measured.

8. The operating method according to claim 7, wherein d) begins when the current measured on the terminals of the elementary cells is less than a predetermined threshold value.

9. An installation for producing hydrogen comprising at least one high temperature electrolyzer, the electrolyzer including:
   a plurality of elementary cells, each of the elementary cells including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet including nickel;
   a single supply inlet for the anode compartments and for the cathode compartments;
   a steam supply for at least the anode compartments connected to the supply inlet;
   a neutral gas source connected to the supply inlet;
   a collector of hydrogen produced at the cathodes and oxygen produced at the anodes;
   a voltage source;
   a control unit controlling the installation so that, during a first operating phase, a temperature of the cells attains an operating temperature between 650° C. and 950° C. and a potential difference on terminals of the elementary cells at least equal to 0.62 V is applied, the control unit controlling the neutral gas supply for the cathode and anode compartments at least during the first phase, and so that, during a second operating phase, a potential difference is applied to the terminals of the elementary cells capable of causing electrolysis of water and the anode and cathode compartments are supplied with steam.

10. The installation for producing hydrogen according to claim 9, wherein the potential difference applied during the second operating phase is greater than the one applied during the first operating phase.

11. The installation for producing hydrogen according to claim 9, wherein the potential difference applied during the first operating phase is less than 0.9V.

12. The installation according to claim 9, further including a sensor for measuring a current on the terminals of the elementary cells, the control unit controlling, according to the measured current value, a water supply of the cathode compartments and the voltage on the terminals of the elementary cells so that a second operating phase for electrolysis of water begins when the value of the measured current is less than a given threshold value corresponding to an amount of nickel oxide at the cathodes of less than a predetermined amount.

13. The installation according to claim 9, wherein the cathodes are in Ni-yttriated zirconia cermet.

14. An installation for producing hydrogen comprising at least one high temperature electrolyzer, the electrolyzer including:
    a plurality of elementary cells, each of the elementary cells including a cathode and an anode separated by an electrolyte, the elementary cells being separated by an interconnection plate, each interconnection plate defining with an adjacent cathode a cathode compartment and with an adjacent anode an anode compartment, the cathodes being made from a cermet including nickel;
    a single supply inlet for the anode compartments and for the cathode compartments;
    a steam supply for at least the anode compartments connected to the supply inlet;
    a collector of hydrogen produced at the cathodes and oxygen produced at the anodes;
    a voltage source;
    a control unit controlling the installation so that, during a first operating phase, a temperature of the cells attains an operating temperature between 650° C. and 950° C. and a potential difference on terminals of the elementary cells at least equal to 0.62 V is applied, the control unit controlling the steam supply for the cathode and anode compartments at least during the first phase, and so that, during a second operating phase, a potential difference is applied to the terminals of the elementary cells capable of causing electrolysis of water.

15. The installation according to claim 14, further including a sensor for measuring a current on the terminals of the elementary cells, the control unit controlling according to the measured current value, the voltage on the terminals of the elementary cells so that a second operating phase for electrolysis of water begins when the measured current value is less than a given threshold value corresponding to an amount of nickel oxide at the cathodes of less than a predetermined amount.

16. The installation for producing hydrogen according to claim 14, wherein the potential difference applied during the second operating phase is greater than the one applied during the first operating phase.

17. The installation for producing hydrogen according to claim 14, wherein the potential difference applied during the first operating phase is less than 0.9V.

18. The installation according to claim 14, wherein the cathodes are in Ni-yttriated zirconia cermet.

* * * * *